United States Patent
Arnold et al.

[11] Patent Number: 5,832,707
[45] Date of Patent: Nov. 10, 1998

[54] CUTTING AND TRANSPORTING DEVICE FOR BLADE PRODUCTS WITH STALKS

[75] Inventors: Rudolf Arnold, Saulgau; Anton Wicker, Salgau-Bogenweiler; Hans Rauch, Saulgau-Kleintissen; Josef Gebele, Hosskirch; Erwin Reber, Saulgau, all of Germany

[73] Assignee: Glass Saulgau GmbH, Saulgau, Germany

[21] Appl. No.: 840,489

[22] Filed: Apr. 21, 1997

[30] Foreign Application Priority Data

Apr. 22, 1996 [DE] Germany .......................... 19615882.6

[51] Int. Cl.⁶ .................................................. A01D 45/02
[52] U.S. Cl. .................................... 56/66; 56/94; 56/102; 56/119
[58] Field of Search .................................... 56/66, 59, 69, 56/75, 78, 82, 88, 98, 106, 108, 74, 81, 86, 91, 92, 96, 94, 102, 119

[56] References Cited

U.S. PATENT DOCUMENTS

| 4,211,059 | 7/1980 | Decoene ..................................... 56/94 |
| 4,272,947 | 6/1981 | Mizzi ........................................... 56/63 |
| 4,771,592 | 9/1988 | Krone et al. ............................. 56/98 X |
| 5,546,737 | 8/1996 | Moosbrucker .............................. 56/94 |
| 5,651,243 | 7/1997 | Arnold et al. .............................. 56/94 |

FOREIGN PATENT DOCUMENTS

| 0 099 527 | 7/1993 | European Pat. Off. . |
| 195 35 454A1 | 3/1997 | Germany . |

Primary Examiner—Michael J. Carone
Assistant Examiner—Robert Pezzuto
Attorney, Agent, or Firm—Michael J. Striker

[57] ABSTRACT

A cutting and transporting device for blade agricultural products with stalks has at least one rotatable cutting disk, at least two coaxially arranged transporting disks having a periphery provided with a plurality of transporting prongs and a plurality of curved depressions for partially surrounding received product stalks, the depressions of at least one of the transporting disks being formed so that they have at least two holding chambers.

9 Claims, 2 Drawing Sheets

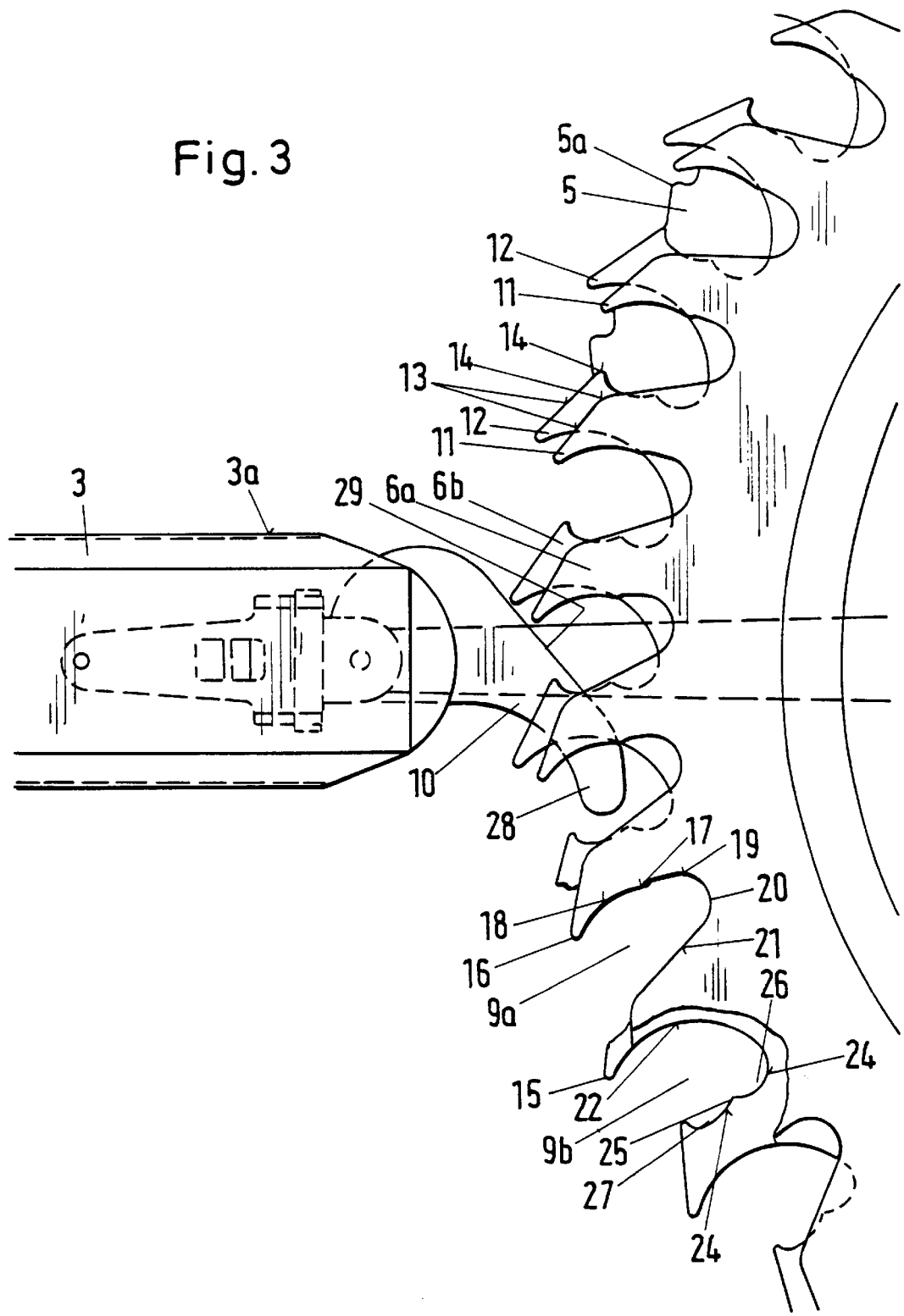

CUTTING AND TRANSPORTING DEVICE FOR BLADE PRODUCTS WITH STALKS

BACKGROUND OF THE INVENTION

The present invention relates to a cutting and transporting device for blade products with stalks, in particular for corn.

One of such devices is disclosed in the European patent application 0099 527, which discloses a cutting and transporting device in particular for corn. Rotatable cutting disks and coaxial transporting disks are provided in this device and rotate partially in the same direction and partially in opposite directions, but always with different peripheral speeds. The cut product stalks are received in depressions between neighboring transporting prongs in the peripheral region of the transporting disks and transported to a discharge location. For maintaining the blades during the transportion in the depressions, stationary plate tips are provided in this patent application. They are bridged by guiding parts which extend in the contour between the transporting disks in the peripheral direction and the blades in the depressions. Since thereby the cutting width is subdivided into a plurality of individual working regions, a cutting space is lost at the one hand, while on the other hand the stalks which do not enter directly in the cutting gap between the distributor tips are pressed and cut inclinedly. The guiding parts moreover interfere with the cutting process, in particular during cutting of fine-blade harvested products.

Another solution is proposed in a not published German patent application 195 35 454, in which in order to eliminate this disadvantages it is proposed to provide the depressions with a curvature extending to the tips of the transporting prongs. The curvature partially surrounds the product stalks, so that the depressions can perform holding functions and no guiding parts are needed in the working width region since the depressions themselves take over the guidance of the blade product.

SUMMARY OF THE INVENTION

Accordingly, it is an object of the present invention to provide a cutting and transporting device which avoids the disadvantages of the prior art.

More particularly, it is an object of present invention to provide such a cutting and transporting device in which the transporting disks reliably perform the holding and grinding functions without guiding parts.

In keeping with these objects and with others which will become apparent hereinafter, one feature of the present invention resides, briefly stated, in a cutting and transporting device for blade products with stalks, in particular for corn, in which the depressions of at least one of the transporting disks are formed so that they form at least two holding chambers.

Since in accordance with the applicant's invention the depressions in at least one of the transporting disks are formed so that they form at least two holding chambers, the depressions can reliably receive the stalks in the chambers and transport the same. Additional guiding parts are not needed.

In accordance with a preferable feature of the present invention, the tool holding chambers are formed so that they include a front chamber and a rear chamber, which is located farther inwardly. The cut stalks can be received in the rear chamber at farther spaced locations, while in the front chamber there is a space for later cut stalks, and so in each depression at least two stalks can be transported.

In accordance with an advantageous embodiment of the invention, the holding chambers are formed on the depressions of the lower transporting disk. It is particularly advantageous when the holding chambers are formed at the not-forwarding flank. The not-forwarding preceding flank of the depression of the lower transporting disk engages the uncut blade product. In particular during cutting of corn, the corn plants with standing corn cobs during the cutting process have the tendency to resist first in their position due to the inertia. When however the corn plant is engaged at the lower end of the stalk by the transporting prongs and therefore the foot is cracked in the peripheral direction of the transporting disk, the upper part of the plant however is not taken along and a moment is produced which causes the corn plant to tilt at its upper end opposite to the rotary direction. This leads to the situation that after cutting the foot of the plant due to the tilting moment, will deviate forwardly and is loaded in direction of the nontransporting flank of the lower transporting disk, while it is supported substantially above on the transporting flank of the upper transporting disk as a rotary point.

When also in the upper transporting disk the corresponding chambers are formed at the front flank, the cut blade product is automatically introduced in the chambers and reliably received in them. The tilting moment of the plant opposite to the rotary direction provides a fixation, so that the further transportation can be performed without any additional guiding parts.

The design of the chamber is obtained in a most suitable way by the contour of the depressions provided with projections. On the lower transporting disk, the projections extend opposite to the rotary direction, while on the upper transporting disk they extend in the rotary direction. The projection subdivide the depressions in two chambers substantially in the middle of its radial extension.

In accordance with a further embodiment of the present invention, a stalk lifter is provided in the center of the working width of the rotor which is formed by the transporting disk and the cutting disk. At its rear end a position transducer is provided, which engages in the region of the contour of the stalk lifter rearwardly between the upper and lower transporting disks. The position transducer has the objective to position the stalk engaged at the previously cut positions in the rear chamber.

The position transducer in accordance with an advantageous embodiment is provided for this purpose with a flank which extend in a rotary direction radially inwardly and with an inclination. The flank ends substantially at the height of the radial distance of the projection of the lower transporting disk. Therefore the stalk which passes on the flank is guided into the contour of the rear chamber and is arrested there because of the above described principle automatically.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a plan view of a part of the cutting and transporting device in accordance with present invention on an enlarged scale.

DESCRIPTION OF PREFERRED EMBODIMENTS

Figure 1:
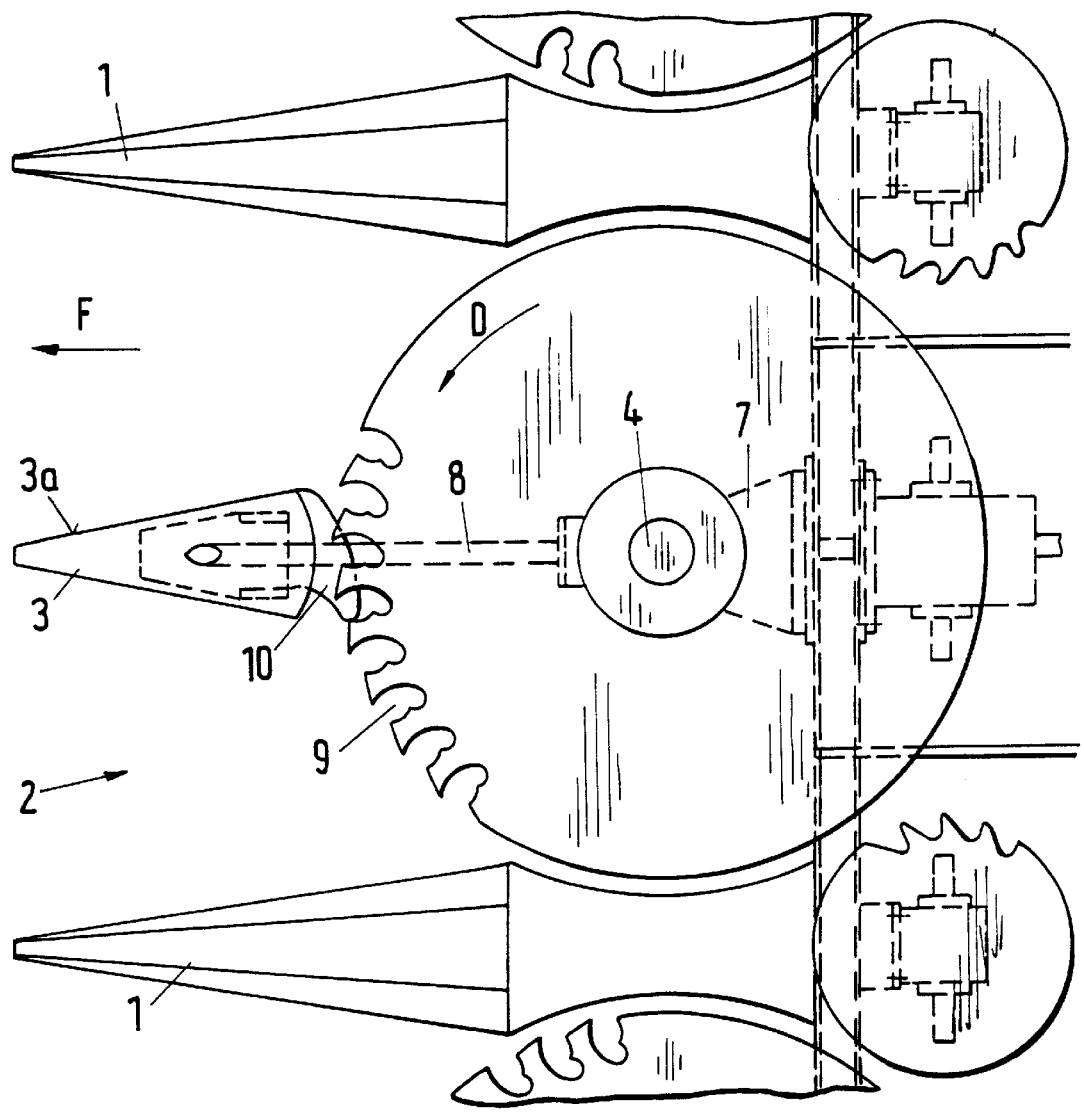
FIG. 1 is a plan view of a cutting and transporting device in accordance with the present invention.

FIG. 1 shows a plan view of a cutting and transporting device in accordance with present invention with several transporting devices which are arranged near one another transversely to a traveling direction F. The transporting devices are separated from one another by four stalk dividers 1. Each device has a cutting and transporting rotor 2 provided centrally with a stalk lifter 3. As can be seen in particular in FIG. 2, a cutting disk 5 and two transporting disks, namely an upper disk 6a and a lower transporting disk 6b are arranged on a substantially vertical rotor shaft 4 coaxially and over one another at distances from one another.

The drive is formed by a horizontal drive shaft through an angular transmission, in which housing 7 the roller shaft 4 is supported. Forwardly and upwardly raising supports 8 are mounted on the angular transmission housing and carry the stalk lifter 3. The both transporting disks 6a, 6b rotate together in direction of the arrow D and are provided at their edge with depressions 9 which will be described in detail hereinbelow. The stalk lifter 3 is formed as a metal plate. It has forwardly a tip and expands rearwardly. With respect to the rotary direction of the transporting disks 6a, 6d, it side 3a is identified as a transporting side. At the rear end of this side inside the contour of the stalk lifter 3 a position transducer 10 extends in direction toward the intermediate space between the upper transporting disk 6a and the lower transporting disk 6b as shown in FIG. 2.

Figure 2:
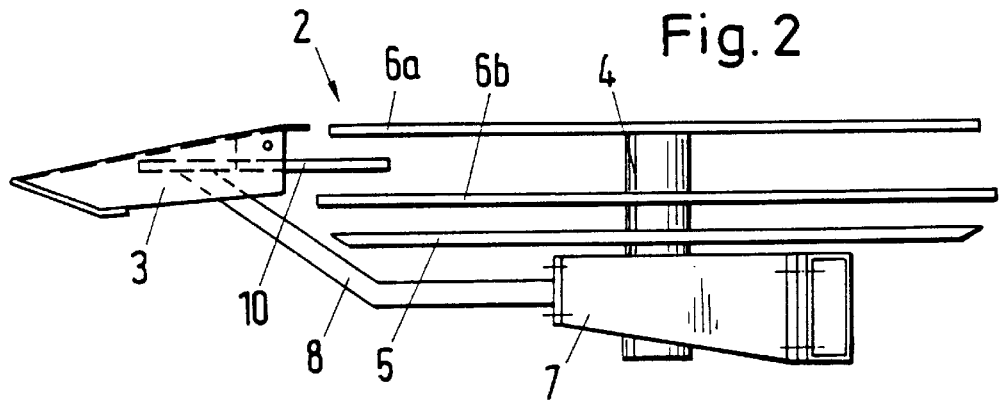
FIG. 2 is a schematic side view of the inventive device of FIG. 1 in which further drive parts are removed.

FIG. 2 shows the construction of the transporting disk and also the cutters in detail. A cutter 5 is located under two depressions in the upper region of FIG. 3 and has a toothed cutting edge 5a. For the sake of clarity, this edge is not identified through all depressions.

Catching strips described in the German patent application 195 35 454 can be mounted on the periphery of the disk 5 on its upper end at distances from one another. They extend at a flat angle to a tangent, while the preceding start of the catching strips is located radially further outwardly than the subsequent end. The cut stalks are thereby loaded radially inwardly to the rotary axis.

FIG. 3 also shows the shape of the depressions of the lower transporting disk 6b and the upper transporting disk 6a. Each transporting disk has transporting prongs. The transporting prongs of the upper transporting disk are identified with reference numeral 11, while the transporting prongs of the lower transporting disk are identified with reference numeral 12. Each prong pair of the upper and lower transporting disk are offset in a rotary direction relative to one another so that the upper transporting prong 11 is located before the lower transporting prong 12 by a small distance. The transporting prongs 11, 12 form a running-in surface at their end sides 13 correspondingly. The trailing edge 14 when considered in a rotary direction is located farther than the corresponding leading tip of the neighboring subsequent transporting prong of the same transporting disk.

As can be seen from the drawing, the contours of the depression are different. FIG. 3 in the lower partial region shows only the upper depressions 9a located near one another and only the lower depressions 9b located near, in order to clearly see their course. As can be seen from the drawing, the depression 9b of the upper transporting disk extends starting from the tip 16 back inwardly in two partial arcs 18 and 19 which radially follow one another and are separated by a projection 17. These partial arcs 18 and 19 of the projection 17 form the forward flank of the depression 9a. From the rear partial ark 19, the depression extends through a semi-circular curvature 20 into the non-transporting flank 21 steeper to radials.

To the contrary, the depression 9b of the lower transporting disks extends from the prong tip 15 outwardly with its forward flank 22 first radially trailing and then radially leadingly curved rearwardly into the non-transporting flank 24. The non-transporting flank 24 is subdivided by a projection 25 into a rear chamber 26 and the front chamber 27.

The thusly produced different shapes of the depressions overlap in the shown manner. As for the relative position and the design of the curvature course which is not given in measuring numbers, curvature radii and angular values, such values can be obtained from the drawings which are generally shown on the scale.

As can be seen from FIG. 3 the transducer 10 extends at the transporting side 3a radially with inclination to the rotary direction inwardly to the contour to the transporting disks and ends with a positioning tip 28 substantially at the height of the projections 17 and 25 which separate the rear chamber. It is located substantially in the contour behind the stalk lifter 3. The flank 29 of the position transducer 10 which faces the transporting side 3a is located at an angle of approximately 45° to radials.

The above described cutting and transporting device operates in the following manner.

The stalks which are cut at the transporting side are engaged by the transporting prongs 11 and 12 and taken along. Because of the above mentioned resisting tendency of the upper part of the stalk product, in particular corn, after the cutting step a tilting moment is produced which tilts the stalk about the supporting point on the transporting flank on the upper transporting disk against the rotary direction, so that the foot region of the stalk coming to abutment under the upper transporting disk is pressed forwardly into the chamber 26 or 27 of the lower depression 9b and is there held. The transporting flank engages the stalk either in a front chamber portion 18 or in a rear chamber portion 19 of the depression 9a of the upper transporting disk. In particular, the chamber subdivision provided by the projections fixes and holds the stalks so that they are transported without falling out and without additional guiding elements. Stalks which are received in the front chamber 27 are transported during the further transportation against the incline flank 29 of the position transducer 10 and slide along it radially inwardly. Thereby they are positioned in the radially inwardly located chamber 26 and on the partial arcuate portion 19 associated with the upper disk, and in particular radially outwardly supported by the projection 25 of the lower transporting disk and also by the projection 17 in the upper transporting disk. Therefore they can not fall out due to inertia forces from the depressions, are reliably held without further dividing parts, and are transported.

Further stalks which are cut behind the stalk lifter 3 as considered in the rotary direction can be taken from the front region of the depressions by the chamber 27 and the associated partial arcuate portion 18 in the upper transporting disk and also reliably held and transported.

For discharging the stalks at the discharge side, preferably rotatably reamer is utilized, as disclosed for example in the German patent application P 195 35 453.2.

It will be understood that each of the elements described above, or two or more together, may also find a useful application in other types of constructions differing from the types described above.

While the invention has been illustrated and described as embodied in cutting and transporting device for blade products with stalks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

We claim:

1. A cutting and transporting device for bladed agricultural products with stalks, comprising at least one rotatable cutting disk; at least two coaxially arranged transporting disks having a periphery provided with a plurality of transporting prongs and a plurality of curved depressions for partially surrounding received product stalks, said depressions of at least one of said transporting disks being formed so that each depression forms at least two holding chambers.

2. A cutting and transporting device as defined in claim 1, wherein said transporting disks include a lower transporting disk and an upper transporting disk, said holding chambers in said depressions being formed in said lower transporting disk.

3. A cutting and transporting device as defined in claim 2, wherein said depressions of said lower transporting disk have non-transporting flanks, said holding chambers being formed at said non-transporting flanks of said depressions of said lower transporting disks.

4. A cutting and transporting device as defined in claim 1, wherein said transporting disks have an upper transporting disk and a lower transporting disk, said depressions with said holding chambers being provided in said lower transporting disk and each having a non-transporting flank and a projection extending opposite to a rotary direction substantially in a central region of said non-transporting flank so as to form said holding chambers.

5. A cutting and transporting device as defined in claim 1, wherein said transporting disks have an upper transporting disk and a lower transporting disk, said upper transporting disk having said depressions provided with transporting flanks, said holding chambers being formed in said depressions of said upper transporting disks at said transporting flanks.

6. A cutting and transporting device as defined in claim 1, wherein said transporting disks have an upper transporting disk and a lower transporting disk, wherein said depression are being provided on said upper transporting disk and being provided with said holding chambers and each having a transporting flank and a projection extending in a rotary direction substantially in a central region of said transporting flank so as to form said holding chambers.

7. A cutting and transporting device as defined in claim 1, wherein said transporting disks and said cutting disk together form a rotor, and further comprising a stalk lifter provided substantially in a center of a working width of said rotor.

8. A cutting and transporting device as defined in claim 7, wherein said stalk lifter has a rear end provided with a positioning member which in a region of a contour of said stalk lifter engages rearwardly between said transporting disks.

9. A cutting and transporting device as defined in claim 8, wherein said positioning member has a flank extending in a rotary direction radially inwardly with an inclination.

* * * * *